(12) United States Patent
Wilson

(10) Patent No.: US 12,077,131 B1
(45) Date of Patent: Sep. 3, 2024

(54) STORAGE COMPARTMENT FOR VEHICLE ROOF PANELS

(71) Applicant: Terry L Wilson, Scottsdale, AZ (US)

(72) Inventor: Terry L Wilson, Scottsdale, AZ (US)

( * ) Notice: Subject to any disclaimer, the term of this patent is extended or adjusted under 35 U.S.C. 154(b) by 140 days.

(21) Appl. No.: 17/987,696

(22) Filed: Nov. 15, 2022

(51) Int. Cl.
*B60R 9/00* (2006.01)
*B60R 9/02* (2006.01)

(52) U.S. Cl.
CPC . *B60R 9/00* (2013.01); *B60R 9/02* (2013.01)

(58) Field of Classification Search
CPC .............. B60R 9/00; B60R 9/02; B60R 9/06
USPC ....... 224/482, 543, 488, 522, 525, 531, 533, 224/536
See application file for complete search history.

(56) References Cited

U.S. PATENT DOCUMENTS

| | | | | |
|---|---|---|---|---|
| 1,778,771 A | * | 10/1930 | Pritchard | B60R 9/02 16/DIG. 15 |
| 2,488,263 A | * | 11/1949 | Bishman | B60R 9/02 224/559 |
| 4,007,864 A | * | 2/1977 | Hreha | B60R 9/02 224/571 |
| 4,785,980 A | * | 11/1988 | Redick | B60R 9/12 224/511 |
| 5,388,738 A | * | 2/1995 | Russell | B60R 9/08 224/544 |
| 5,465,883 A | * | 11/1995 | Woodward | B60R 9/06 224/558 |
| 5,595,333 A | * | 1/1997 | Boston | B60R 9/06 224/532 |
| 6,032,842 A | * | 3/2000 | Brickner | B60R 9/02 224/571 |
| 6,039,227 A | * | 3/2000 | Stark | B60R 9/08 224/531 |
| 6,889,881 B2 | * | 5/2005 | Wilkens | B60R 9/065 224/511 |
| 7,090,105 B2 | * | 8/2006 | Adamczewski | B60R 9/02 224/543 |
| 7,275,670 B1 | * | 10/2007 | Shumack | B60R 9/06 224/518 |
| 7,293,681 B2 | * | 11/2007 | Wills | B60R 9/06 224/495 |
| 7,802,708 B2 | * | 9/2010 | Adamczewski | B60R 9/02 224/543 |
| 7,900,801 B2 | * | 3/2011 | Huang | B60R 9/10 224/500 |
| 8,047,384 B2 | * | 11/2011 | Mrowiec | E01F 9/70 211/44 |
| 8,403,192 B1 | * | 3/2013 | Roller | B60R 9/06 224/521 |
| 10,278,503 B1 | * | 5/2019 | Morrison | B60R 9/02 |
| 10,384,499 B2 | * | 8/2019 | Schocke | B60D 1/065 |

(Continued)

*Primary Examiner* — Justin M Larson
(74) *Attorney, Agent, or Firm* — Plager Schack LLP; Mark H. Plager, Esq.; Kara K. Verryt, Esq.

(57) ABSTRACT

A storage compartment for removable vehicle roof panels, wherein the storage compartment is configured to be mounted on an exterior of a vehicle may include a cradle sized to accommodate placement of an end of a roof panel therein; at least two slats extending upward from the cradle; a clamp attached to the distal end of each slat; and a bracket attached to a proximal end of each slat, wherein each clamp is configured to removably engage with an upper surface on a side of the vehicle and each bracket is configured to removably engage with a lower surface on the side of the vehicle.

9 Claims, 3 Drawing Sheets

(56) References Cited

U.S. PATENT DOCUMENTS

| | | | | |
|---|---|---|---|---|
| 10,882,458 | B2 * | 1/2021 | Laborde, Jr. | F41C 33/005 |
| D931,781 | S * | 9/2021 | Zheng | D12/406 |
| 11,358,533 | B2 * | 6/2022 | Engelke | B60K 15/067 |
| 11,597,329 | B2 * | 3/2023 | Stump | B60R 9/06 |
| 11,884,246 | B1 * | 1/2024 | Jankowski | B60R 9/10 |
| 2005/0258200 | A1 * | 11/2005 | Scola | B62D 43/02 |
| | | | | 224/42.13 |
| 2006/0065688 | A1 * | 3/2006 | Hasz | B60R 9/06 |
| | | | | 224/521 |
| 2007/0181624 | A1 * | 8/2007 | Smith | B60R 9/00 |
| | | | | 224/533 |
| 2008/0110949 | A1 * | 5/2008 | Adamczewski | B60P 3/002 |
| | | | | 224/329 |
| 2008/0135592 | A1 * | 6/2008 | Corso | B60R 9/02 |
| | | | | 224/555 |
| 2015/0083769 | A1 * | 3/2015 | Williams | B60R 9/10 |
| | | | | 224/488 |
| 2015/0283951 | A1 * | 10/2015 | Singleton | B60J 7/106 |
| | | | | 224/519 |
| 2021/0221297 | A1 * | 7/2021 | Laborde, Jr. | B60R 7/14 |
| 2022/0314892 | A1 * | 10/2022 | Engelke | B60K 15/06 |

* cited by examiner

STORAGE COMPARTMENT FOR VEHICLE ROOF PANELS

BACKGROUND

The embodiments described herein relate generally to vehicle accessories and, more particularly, to a storage compartment for roof panels of a vehicle, such as a JEEP off-road vehicle, wherein the storage compartment engages with an exterior of the vehicle.

Roof panels of off-road vehicles do not have a convenient external storage solution. Additionally, storing the panels inside the vehicle is limited due to space constraints.

Therefore, what is needed is an externally mounted storage compartment for removable roof panels on an off-road vehicle.

SUMMARY

Some embodiments of the present disclosure include a storage compartment for removable vehicle roof panels, wherein the storage compartment is configured to be mounted on an exterior of a vehicle. The storage compartment may include a cradle sized to accommodate placement of an end of a roof panel therein; at least two slats extending upward from the cradle; a clamp attached to the distal end of each slat; and a bracket attached to a proximal end of each slat, wherein each clamp is configured to removably engage with an upper surface on a side of the vehicle and each bracket is configured to removably engage with a lower surface on the side of the vehicle.

BRIEF DESCRIPTION OF THE FIGURES

The detailed description of some embodiments of the invention is made below with reference to the accompanying figures, wherein like numerals represent corresponding parts of the figures.

DETAILED DESCRIPTION

In the following detailed description of the invention, numerous details, examples, and embodiments of the invention are described. However, it will be clear and apparent to one skilled in the art that the invention is not limited to the embodiments set forth and that the invention can be adapted for any of several applications.

The device of the present disclosure may be used as an externally mounted storage compartment for removable vehicle roof panels and may comprise the following elements. This list of possible constituent elements is intended to be exemplary only, and it is not intended that this list be used to limit the device of the present application to just these elements. Persons having ordinary skill in the art relevant to the present disclosure may understand there to be equivalent elements that may be substituted within the present disclosure without changing the essential function or operation of the device.

The various elements of the present disclosure may be related in the following exemplary fashion. It is not intended to limit the scope or nature of the relationships between the various elements and the following examples are presented as illustrative examples only.

Figure 1:
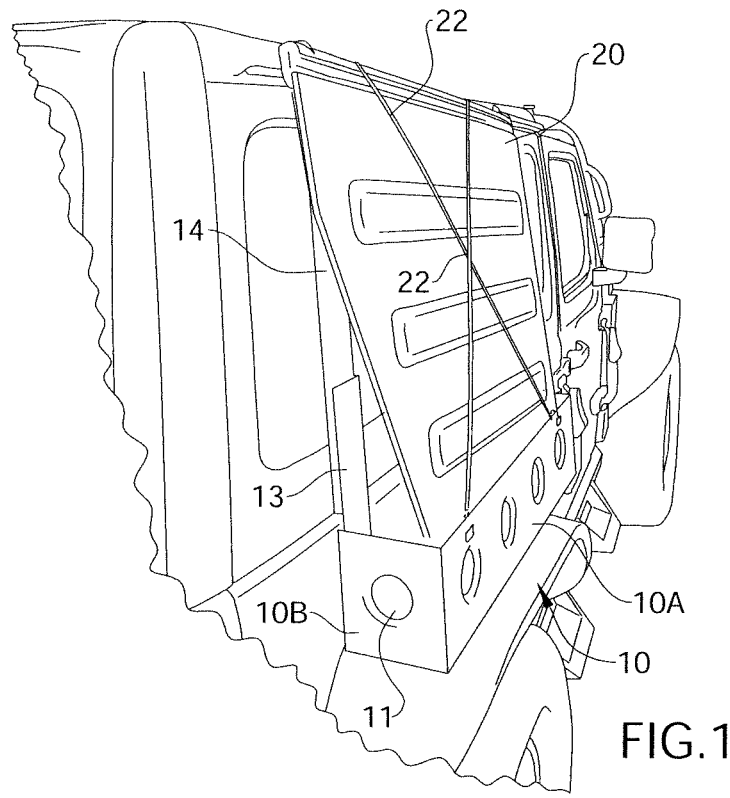
FIG. 1 is a perspective view of one embodiment of the present disclosure, shown in use.

By way of example, and referring to FIGS. 1-4, some embodiments of the present disclosure include a storage compartment for removable vehicle roof panels, wherein the storage compartment is configured to be mounted on an exterior of a vehicle. The storage compartment may comprise a cradle 10 sized to accommodate placement of an end of a roof panel 20 therein, at least two slats 14 extending upward from the cradle 14; a clamp 24 attached to a distal end of each respective slat of the at least two slats 14; and a bracket 15 attached to a proximal end of each respective slat 14 of the at least two slats 14, wherein the clamp 24 is designed to removably engage with an upper surface on a side of the vehicle and the bracket 15 is designed to removably engage with a lower surface on a side of the vehicle. For example, the clamp 24 and the bracket 15 may be designed to removably engage with upper and lower edges of a rear window panel on a vehicle, as shown in FIG. 1.

More specifically, the cradle 10 may comprise an open top elongate box having a base 10D, a front wall 10A extending substantially perpendicularly upward from a front edge of the base 10D, a pair of sidewalls 10B, each sidewall 10B of the pair of sidewalls 10B extending substantially upward from side edges of the base 10D, and rear wall 10C extending substantially upward from a rear edge of the base 10D. As shown in the Figures, the base 10D may be substantially rectangular, wherein the front edge and the rear edge are longer than the side edges. The front wall 10A and the sidewalls 10B may each have a uniform, equal height. The rear wall 10C, however, may have taller left and right portions (proximate to each of the sidewalls 10B) and a shorter central height. In use, the rear wall 10C may be positioned against the vehicle 18, while the front wall 10A may face away from the vehicle 18. In embodiments, at least one of the front wall 10A and the sidewalls 10B may have at least one airflow orifice 11 extending therethrough. In some embodiments, the base 10D may also have at least one airflow orifice 11 extending therethrough. For example, as shown in the Figures, each sidewall 10B may have a single, circular airflow orifice 11 extending therethrough, while the front wall 10A may have a plurality of, such as four, circular airflow orifices 11. However, the size and shape of the airflow orifices 11 are not particularly limited.

Figure 3:
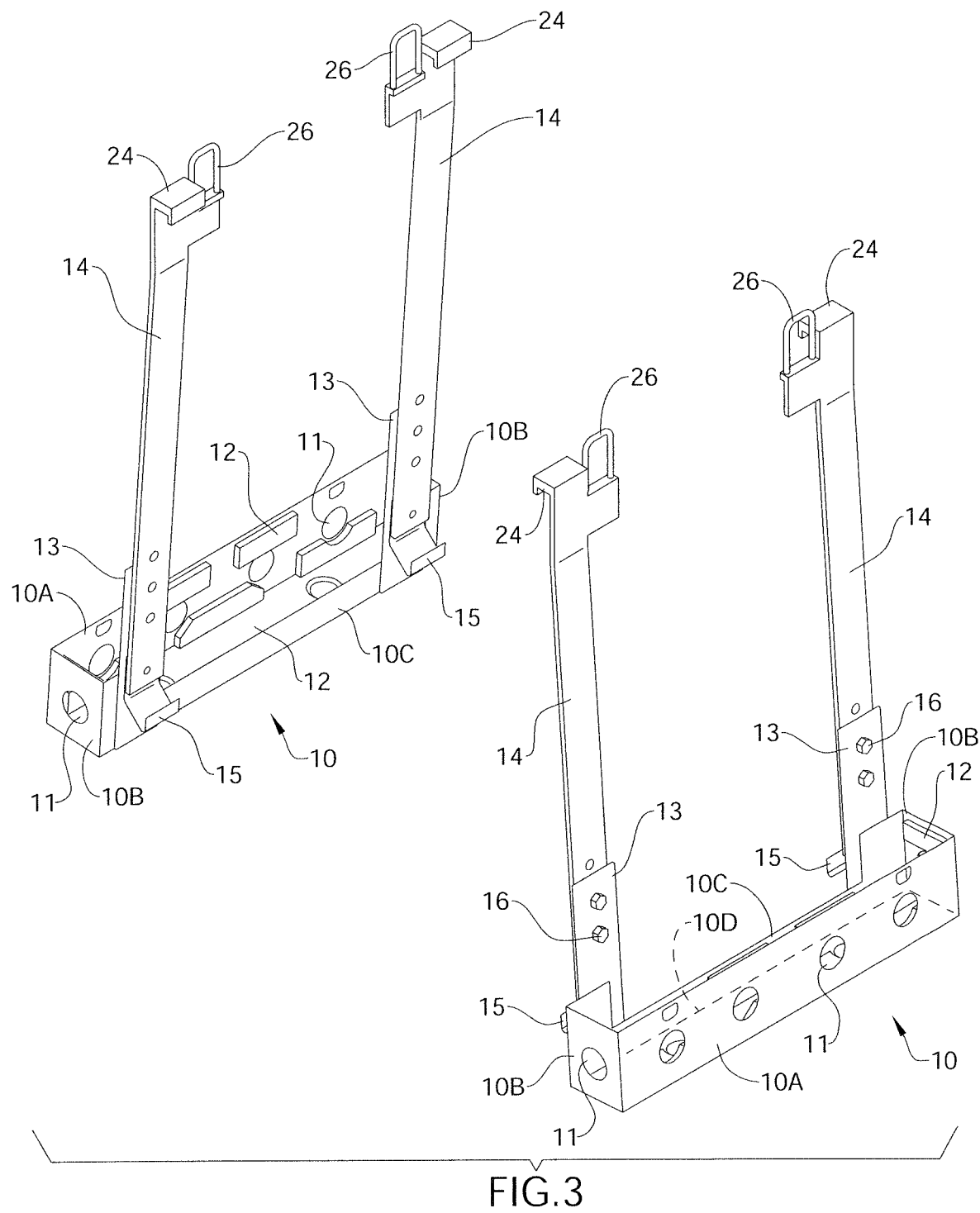
FIG. 3 is a perspective view of one embodiment of the present disclosure.
Figure 4:
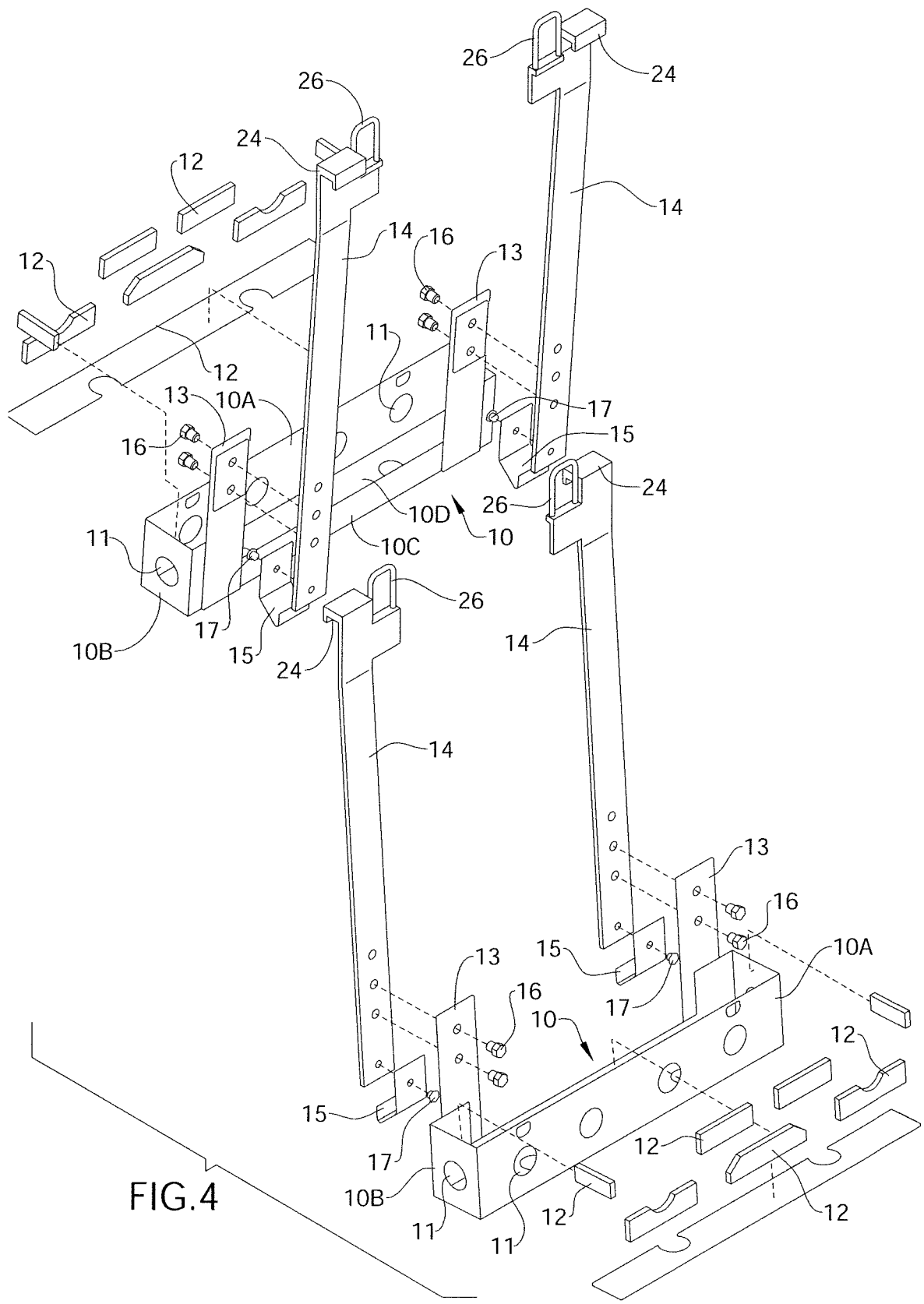
FIG. 4 is an exploded view of one embodiment of the present disclosure.

In embodiments, interior surfaces of the cradle 10 may have padding attached thereto, wherein the padding helps prevent damage to the roof panel 20 during use of the cradle 10. For example, and as shown in FIGS. 3 and 4, the interior surfaces of the cradle 10 may have a plurality of pads 12 attached thereto. More specifically, the base 10D may have an elongate pad 12 attached thereto, and each of the interior surfaces of the sidewalls 10B may have a smaller rectangular pad 12 attached thereto, such as vertically above the airflow orifice 11. The interior surface of the front wall 10A may have a plurality of pads 12 attached thereto.

As shown in the Figures, the first support plate 13 and a second support plate 13 may extend upward from an exterior surface of the rear wall 10C. As shown in FIG. 4, each of the support plates 13 may extend upward from a respective side of the rear wall 10C, such as proximate to each taller left and right portions. In embodiments, the support plates 13 may either be permanently attached to the rear wall 10C, such as by being welded thereto, or the support plates 13 may be attached to the rear wall 10C using a conventional fastener. As shown in the Figures, the support plates 13 may each be substantially rectangular, wherein a distal end of each support plate 13 may comprise a plurality of, such as two, fastener orifices. In some embodiments, the support plates 13 may be configured to removably or adjustably attach to the proximal ends of each of the slats 14. More specifically as shown in the Figures, the proximal end of each of the slats 14 may comprise a plurality of fastener orifices extending therethrough, wherein a conventional fastener, such as a screw 16, may be engaged with a fastener orifice on the proximal end of the slat and with a fastener orifice on the support plate 13 to attach the proximal end of the slat 14 to the support plate 13. As shown in the Figures, the slats 14 may have a plurality of fastener orifices, such that the positioning of the cradle along the length of the slats 14 is adjustable. The adjustability may allow for accommodating vehicles with various fender configurations.

As shown in FIG. 4, each of the slats 14 may further comprise an additional fastener orifice extending therethrough at a proximal end thereof. The additional fastener orifice may be positioned to removably engage with a bracket 15 via a fastener, such as bracket screw 17. As shown in the Figures, the bracket 15 may comprise a hooked bracket structure designed to removably engage with a lower surface on the side of the vehicle, such as with a lower edge of a window. More specifically, the bracket 15 may comprise a planar top bracket portion, an angled bracket portion extending outward at an angle from a lower edge of the planar top bracket portion, and a lip extending upwards from a distal end of the angled bracket portion. In some embodiments, the lip may be positioned substantially parallel to the planar top bracket portion. In use, the bracket 15 may be configured to removably engage the cradle 10 with a lower edge of a window on the vehicle to maintain the positioning of the cradle 10 against the vehicle during use thereof. As shown in, for example, FIG. 3, the bracket 15 may be attached to and extend outward from an opposite side of the slat 14 as the cradle 10.

As mentioned above and as shown in the Figures, a distal end of the slat 14 may have a clamp 24 attached thereto, wherein the clamp 24 is designed to removably engage with an upper surface on the side of the vehicle, such as with an upper edge of a window. More specifically, the clamp 24 may comprise a hooked clamp structure comprising first portion attached to the distal end of the slat 14, a top member extending substantially perpendicularly outward from the first portion, and a lip extending substantially perpendicularly downward from a distal end of the top member, wherein the lip is positioned to engage with the top edge of the window. As shown in, for example, FIG. 3, the clamp 24 may extend outward from an opposite side of the slat 14 than the cradle 10. During use, the clamp 24 may engage with a top edge of the window, as mentioned above, and, thus, the device of the present disclosure may not interfere with the ability to simultaneously use a roof rack mounted on the vehicle. In embodiment, the clamp 24 may be a locking clamp, allowing the clamp 24 to be secured to the top edge of the window such that the device of the present disclosure may not unintentionally fall off the vehicle.

As shown in FIG. 3, a side protrusion may also extend outward from a distal end of the slat 14, wherein a loop 26 may extend upwards from a top surface of the side protrusion. As such, the loop 26 may be positioned adjacent to the clamp 24. In embodiments, the loop 26 may be positioned adjacent to an inner side of the clamp 24.

Figure 2:
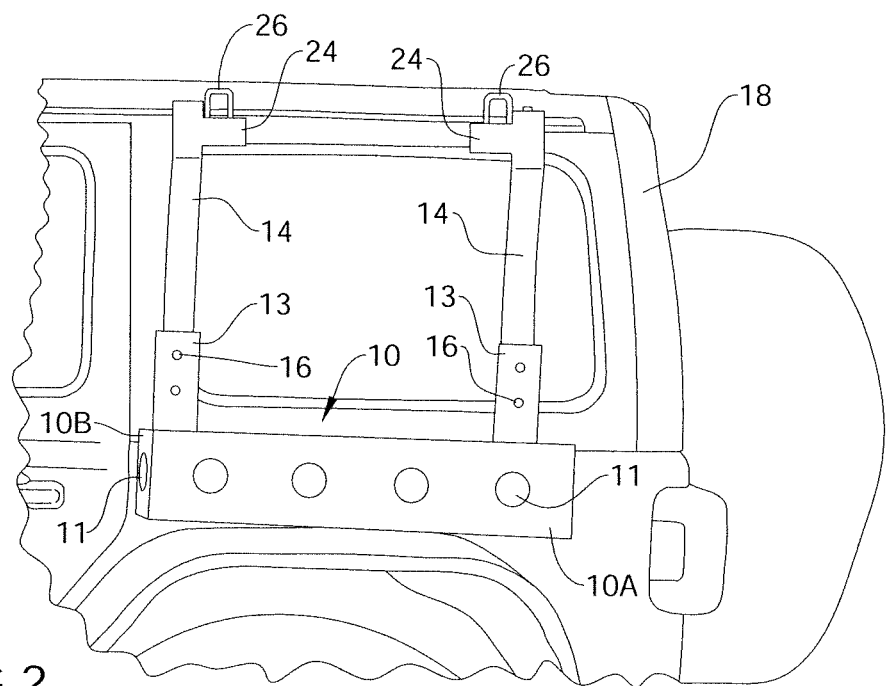
FIG. 2 is a perspective view of one embodiment of the present disclosure, shown installed.

As shown in FIG. 2, the device of the present disclosure may be installed by first mounting the slats 14 to the rear window of the vehicle by engaging the clamp 24 with a top edge of the window and the bracket 15 with the bottom edge of the window. The cradle 10 may then be positioned above the fender of the vehicle, and the support plates 13 may be attached to the proximal end of the slats 14, thus securing the cradle 10 to the slats 14 and the vehicle 18. As shown in FIG. 1, an edge of the roof panel 20 may then be placed into the cradle 10 with an opposite edge of the roof panel 20 angled toward the loops 26. A pair of securing straps 22, such as bungee cords may be attached to both the cradle 20 and the loops 26 to secure the roof panel 20 within the cradle 10. While not shown in the Figures, a wind deflector and protecting covering may then be secured to the device of the present disclosure and over the roof panel 20. The storage compartment of the present disclosure provides a user with a more efficient space to store roof panels versus the conventional storage means. It also creates a greater usable space in the vehicle, offering easy on and off access to roof panels. Because the roof panels are stored on the vehicle versus in a separate storage area, such as a garage, the user is able to respond to inclement weather and changing conditions quickly.

The components of the storage compartment of the present disclosure may be made of any suitable materials, such as aluminum or carbon to keep the product lightweight yet durable. The components may be assembled using various techniques, such as injection molding or metalwork.

The above-described embodiments of the invention are presented for purposes of illustration and not of limitation. While these embodiments of the invention have been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

What is claimed is:

1. A storage compartment for removable vehicle roof panels, wherein the storage compartment is configured to be mounted on an exterior of a vehicle, the storage compartment comprising:
   a cradle sized to accommodate placement of an end of a roof panel therein;
   at least two slats extending upward from the cradle;
   a first clamp attached to a distal end of a first slat of the at least two slats;
   a second clamp attached to a distal end of a second slat of the at least two slats;
   a first bracket attached to a proximal end of the first slat;
   a second bracket attached to a proximal end of the second slat; a first loop positioned adjacent to the first clamp; and a second loop positioned adjacent to the second clamp, wherein
   each of the first clamp and the second clamp is configured to removably engage with an upper surface on a side of the vehicle;
   each of the first bracket and the second bracket is configured to removably engage with a lower surface on the side of the vehicle; and each of the first loop and the second loop are configured to engage with a respective securing strap.

2. The storage compartment of claim 1, wherein the cradle comprises an open top elongate box comprising:
- a base;
- a front wall extending upward from a front edge of the base;
- a pair of sidewalls, each sidewall of the pair of sidewalls extending upward from a respective side edge of the base; and
- a rear wall extending upward from a rear edge of the base.

3. The storage compartment of claim 2, wherein the front wall and each sidewall of the pair of sidewalls have a uniform, equal height.

4. The storage compartment of claim 2, wherein the rear wall comprises taller left and right portions and a shorter central height.

5. The storage compartment of claim 2, further comprising at least one airflow orifice extending through the cradle.

6. The storage compartment of claim 2, further comprising a first support plate and a second support plate extending upward from the rear wall,
wherein:
- a distal end of each of the first support plate and the second support plate comprises a plurality fastener orifices extending therethrough; and
- the first support plate and the second support plate are adjustably engaged with the proximal ends of the first slat and the second slat, respectively.

7. The storage compartment of claim 1, further comprising padding attached to interior surfaces of the cradle.

8. The storage compartment of claim 1, wherein each of the first bracket and the second bracket comprises a hooked bracket structure.

9. The storage compartment of claim 1, wherein each of the first clamp and the second clamp comprises a hooked clamp structure.

\* \* \* \* \*